(12) United States Patent
Kruse et al.

(10) Patent No.: US 10,972,288 B2
(45) Date of Patent: *Apr. 6, 2021

(54) CONTRIBUTION SIGNATURES FOR TAGGING

(71) Applicant: Amazon Technologies, Inc., Reno, NV (US)

(72) Inventors: William Frederick Hingle Kruse, Seattle, WA (US); Conor Patrick Cahill, Waterford, WA (US); Jeffrey Cicero Canton, Seattle, WA (US); Dmitry Frenkel, Bothell, WA (US); Harshad Vasant Kulkarni, Redmond, WA (US); Colin Watson, Seattle, WA (US); Andrew Paul Mikulski, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,734

(22) Filed: Dec. 24, 2019

(65) Prior Publication Data

US 2020/0136834 A1 Apr. 30, 2020

Related U.S. Application Data

(63) Continuation of application No. 14/979,308, filed on Dec. 22, 2015, now Pat. No. 10,536,277.

(51) Int. Cl.
*H04L 29/06* (2006.01)
*H04L 9/32* (2006.01)
*G06F 12/14* (2006.01)

(52) U.S. Cl.
CPC ........ *H04L 9/3247* (2013.01); *G06F 12/1408* (2013.01); *H04L 63/061* (2013.01); *H04L 63/126* (2013.01); *G06F 2212/402* (2013.01)

(58) Field of Classification Search
CPC ... H04L 9/3247; H04L 63/061; H04L 63/126; G06F 12/1408
See application file for complete search history.

(56) References Cited

U.S. PATENT DOCUMENTS 8,260,931 B2  9/2012  Balasubramanian
9,367,609 B1  6/2016  Mianji
(Continued)

OTHER PUBLICATIONS

Non-Final Office Action issued in U.S. Appl. No. 14/979,308 dated Aug. 29, 2017.
(Continued)

*Primary Examiner* — Carl G Colin
*Assistant Examiner* — Vance M Little
(74) *Attorney, Agent, or Firm* — Hogan Lovells US LLP

(57) ABSTRACT

A request to add tags (e.g., labels, key-value pairs, or metadata) to resources can be digitally signed by the entity making the request, such that the source can be verified and an authorization determination made for each tag. For a request involving multiple services (or entities) that can each add tags, any tag added by a service can be included in the request and digitally signed by that service. Each service processing the request can also digitally sign the request before forwarding, so that each service signs a version of the request, which includes elements signed by other services earlier in the request chain. When the request is received to a tagging service, the service ensures that every tag was digitally signed by the appropriate authorized entity or service, and validates the signatures to ensure that no data was modified or omitted, before adding the tags to the designated resource(s).

20 Claims, 9 Drawing Sheets

(56) References Cited

U.S. PATENT DOCUMENTS

| | | | |
|---|---|---|---|
| 9,420,007 B1* | 8/2016 | Roth | G06F 21/602 |
| 2005/0125659 A1 | 6/2005 | Sarfati | |
| 2006/0206925 A1 | 9/2006 | Dillaway | |
| 2010/0235649 A1* | 9/2010 | Jeffries | G06F 21/6209 |
| | | | 713/189 |
| 2012/0110651 A1 | 5/2012 | Van Biljon | |
| 2014/0019423 A1* | 1/2014 | Liensberger | G06F 16/2358 |
| | | | 707/690 |
| 2014/0208119 A1 | 7/2014 | Chang | |
| 2014/0214772 A1 | 7/2014 | Kadayam | |
| 2015/0288704 A1 | 10/2015 | Huang | |
| 2016/0219097 A1 | 7/2016 | Gupte | |

OTHER PUBLICATIONS

Final Office Action issued in U.S. Appl. No. 14/979,308 dated Mar. 2, 2018.
Non-Final Office Action issued in U.S. Appl. No. 14/979,308 dated Sep. 20, 2018.
Final Office Action issued in U.S. Appl. No. 14/979,308 dated Apr. 18, 2019.
Notice of Allowance issued in U.S. Appl. No. 14/979,308 dated Sep. 16, 2019.

* cited by examiner

CONTRIBUTION SIGNATURES FOR TAGGING

CROSS REFERENCE TO RELATED APPLICATION

This application is a Continuation of, and accordingly claims the benefit of priority from, U.S. patent application Ser. No. 14/979,308, filed with the U.S. Patent and Trademark Office on Dec. 22, 2015, the entirety of which is hereby incorporated herein by reference for all intents and purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. In conventional systems there is no way to authorize individual elements within such a request, or to identify the contributors of certain elements within the request. Services at the end of a request chain may be tasked with performing or triggering tasks for the request, but there can be problems with the end service performing tasks for systems earlier in the request chain or the authorization information differing based on the path of the specific request chain.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access to resources in an electronic environment. In particular, various approaches provide for the tagging of resources in a service environment, such as a multi-tenant environment, in order to ensure that proper rules or policies are applied, etc. The resources can have tags applied, where the tags can include labels, key-value pairs, or other metadata as discussed elsewhere herein. The "key" of a key-value pair can refer to, for example, a database or search key, along with a corresponding value for that database or search key, such as "customer=jane." A source such as a client device or application can generate a request, such as a request to provision a resource, where the request can include tags to be added to the resource. The tags included in the request, as well as the request itself, can be digitally signed using a private key, or other such credential, for a customer or other such entity associated with the request. The private key in this case can refer to, for example, a symmetric or asymmetric cryptographic key.

For a request that involves multiple services that can each add tags, any tag added by a service can be included in the request and digitally signed using the signature or private key (symmetric or asymmetric) for that service. Each service processing the request can also digitally sign the request before forwarding, so that each service signs the entire request, which includes elements signed by other services earlier in the request chain. When the request is received to a tagging service (or "notation" service), the service ensures that every tag (e.g., label, key-value pair, or other metadata) was digitally signed by the appropriate authorize entity or service, and validates the signatures to ensure that none of the data was modified or omitted, before adding the tags to the designated resource(s). Such an approach provides a way to authorize individual elements within a request, as well as to identify the contributors of certain elements within the request.

Various other such functions can be used as well within the scope of the various embodiments as would be apparent to one of ordinary skill in the art in light of the teachings and suggestions contained herein.

Figure 1:
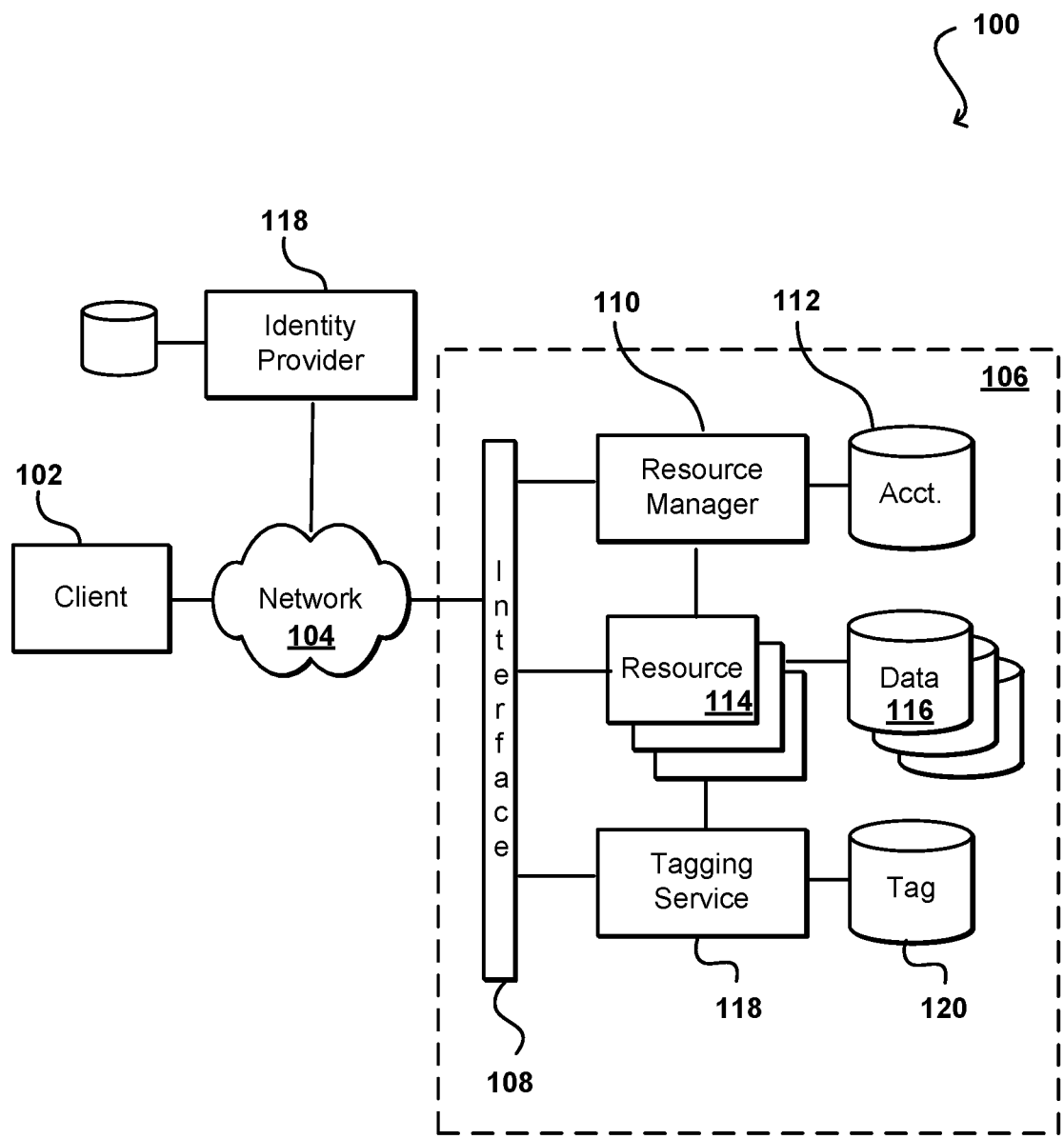
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In various instances, the ways in which resources are utilized can depend at least in part on any rules or policies that apply to processing or tasks performed by those resources. In order to ensure that data and resources are processed properly regardless of location in the resource provider environment, various embodiments provide for the "tagging" of various resources, files, data, and others such items or elements. A "tag" as used herein can refer to an object or token, such as a key value pair, that can be applied to a resource or other such object. As an example, a user might want to apply a tag such as "owner=CustomerID" to a resource instance in order to ensure that any rules or policies specified by that user and associated with the customer ID will be applied to processing performed by that resource instance. In some embodiments, a tagging service 118 can be utilized that, in response to an appropriate request, can cause an appropriate tag to be applied to the corresponding resource(s). Data for the tags can be stored to a tag data store 120, or other such location. Various components and services in the resource provider environment can utilize tags in part by communicating with the tagging service. The tag data store 120 thus can function as a central repository for the tag information within the resource provider environment.

A potential difficulty exists, however, in managing how the tags are applied and managed in the environment. For example, specific tasks might require a series of actions performed by different services over time. If a user wants to store data to a data volume, for example, that user might have to send a request to the resource provider environment, which can send a request to a service for launching a virtual machine, which can make a call to provision a data volume. Using conventional approaches, the service creating the data volume would make a call to the tagging service to cause certain tags to be applied to the data volume once provisioned. The tagging service, however, may have no way of verifying whether the tags indicated by the service are a complete and accurate set of tags, and that the service is authorized to cause those tags to be applied. The end service in the request chain may have full authority to add tags on behalf of others in the chain, regardless of whether the others in the chain would have added those tags. Further, there is no way to tell if one of the tags that would have been applied by an earlier service in the chain was omitted or removed.

Accordingly, approaches in accordance with various embodiments enable various entities and components, such as customers, client devices, systems, and services, to apply tags to various items, resources, or elements. The tags in at least some embodiments can be key-value pairs applied by the respective entities. In order to ensure that the appropriate entity added that tag, the tag contribution can be signed using a digital signature for that entity. Thus, if a client device adds a tag to a template, for example, the client device can also cause that tag (or a request including that tag) to be digitally signed by the client device, as may correspond to a user of the client device. In this way, a recipient of the request can determine the client-specific tags, and can also determine that the tags were applied by the appropriate entity, in this case the client device.

Further, the signatures can be propagated along the request chain such that a determination can be made as to the entity that caused each tag or request to be added. This can help to verify the inclusion of each tag and source of each request. Further, because each signature and request along the chain builds on the earlier request, a determination can be made as to whether any tags were removed from the request chain, whether intentionally or unintentionally. Such an approach can help to verify that the inclusion of any tags and generation of any requests were performed by an appropriate and/or authorized entity, and that all appropriate tags or requests are included. A tagging service can be able to verify the signatures on each tag or request, whether by using a local copy of the private key (or other credentials) or working with a credential management service, among other such options.

Figure 2:
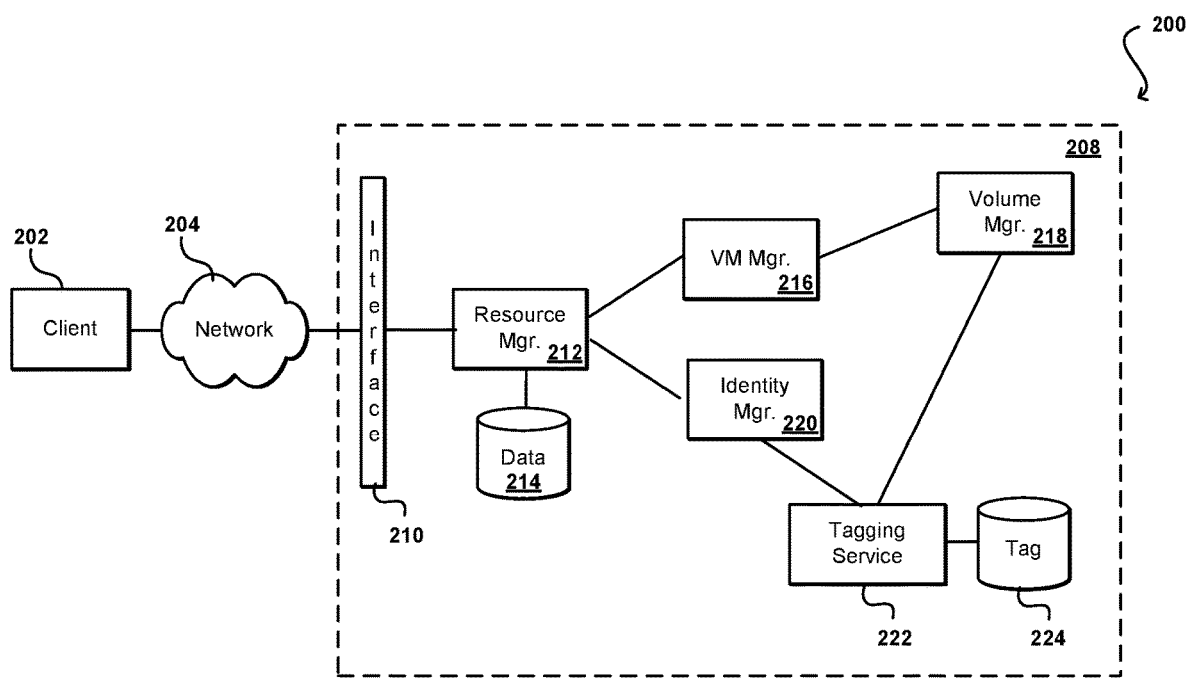
FIG. 2 illustrates an example set of components of a request chain that can be utilized in accordance with various embodiments.

FIG. 2 illustrates an example environment 200 in which multiple services are able to make requests, add tags, and perform other such actions as described and suggested herein. In this example the client device 202 is associated with a customer having an account with a provider of a resource provider environment, service provider environment, or other multi-tenant environment 208. The client device 202 is able to submit requests across at least one network 204 to be received to an interface of the multi-tenant environment. As mentioned previously, the customer might want to provision resources in the environment, such as to have a data volume that is attached to a virtual machine for performing I/O operations on behalf of the customer.

Figure 3:
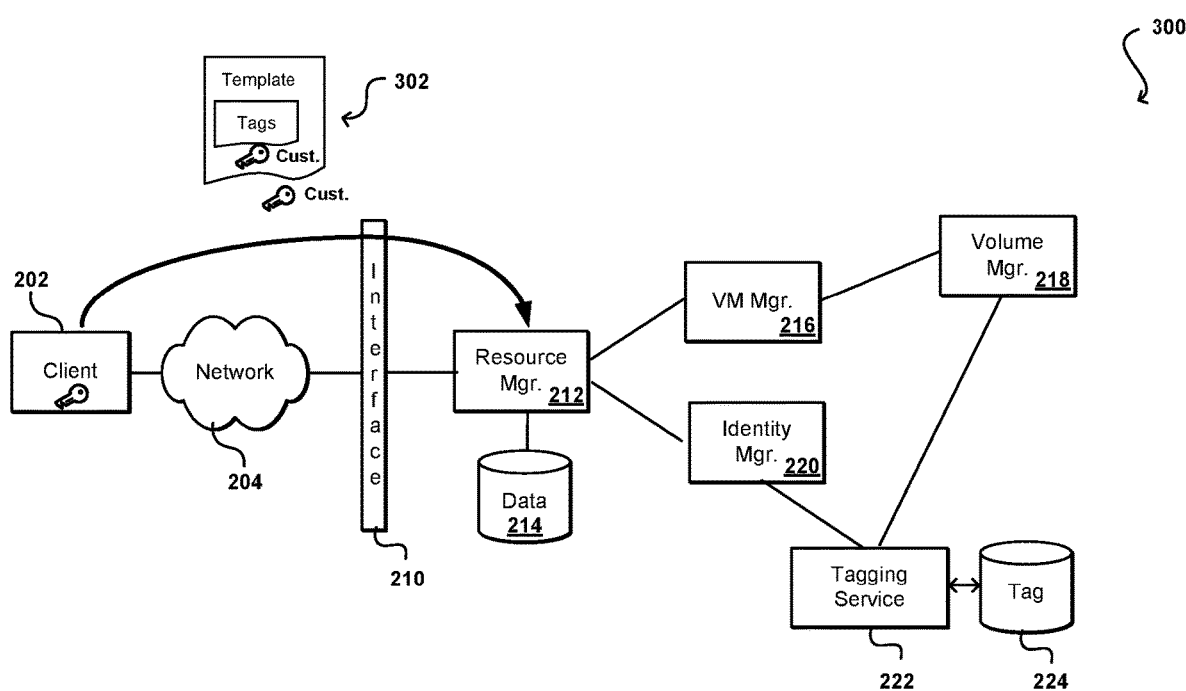
FIG. 3 illustrates a first request along a request chain that can be utilized in accordance with various embodiments.

In the example situation 300 of FIG. 3, the client device sends a request to a resource manager 212, or other management service, to provision resources on behalf of an associated customer. The client device 202 can store a customer key that is associated with the customer, and can be used to digitally sign requests on behalf of the customer. In this example, the client device can provide a request 302 that includes a template for provisioning the resources on behalf of the customer. The template may be generated by a management console, for example, that is executing on the client device and associated with the multi-tenant environment. The customer may want to add one or more tags to the request, that are to be applied to the resulting data volume once provisioned. These can include tags such as, for example, type=production and owner=CustomerID. The client device can cause the tags to be included in the request 302. The client device can then also cause the tags and/or overall request to be signed using a digital signature of the customer. This way, a determination can be made that the customer authorized the adding of tags, as well as the request sent to the resource manager.

Figure 4:
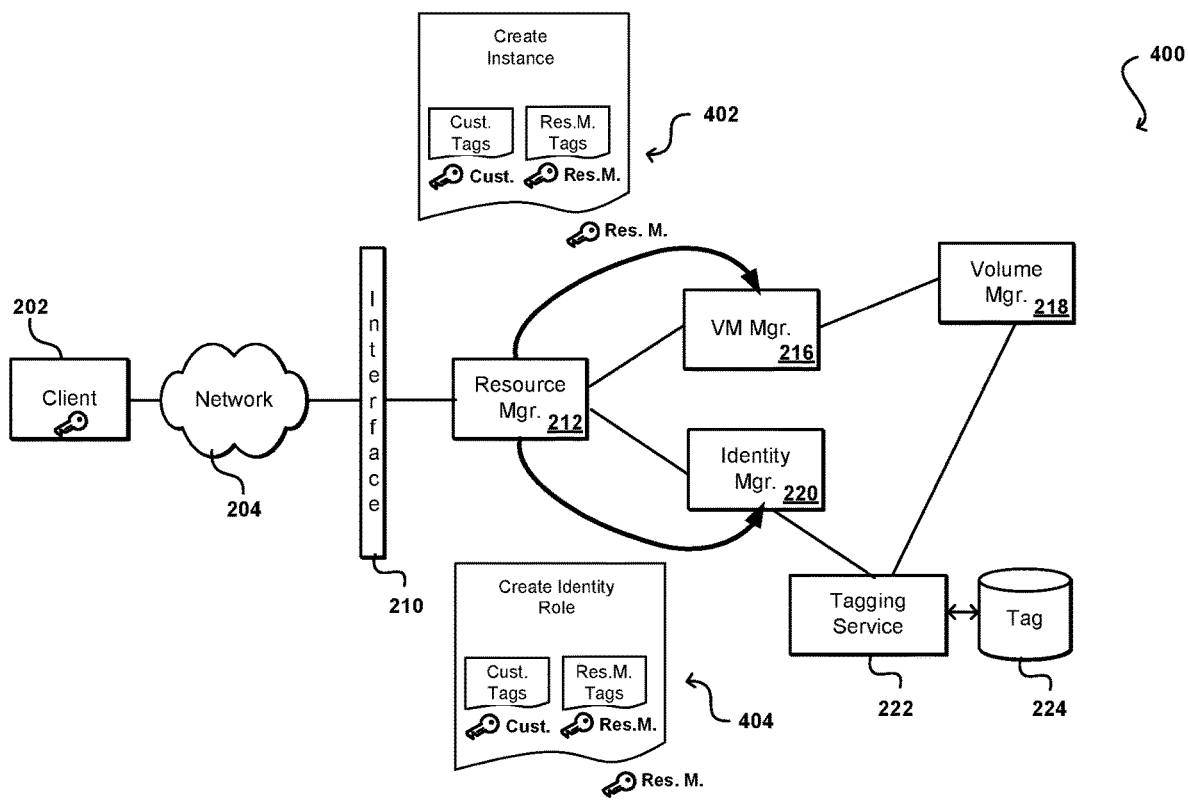
FIG. 4 illustrates second and third requests along a request chain that can be utilized in accordance with various embodiments.

Once received to the resource manager 212, the resource manager can determine additional services to be contacted for the request. It should be noted that reference numbers are carried over between figures for simplicity of explanation, but such usage should not be interpreted as a limitation on the scope of the various embodiments unless otherwise specifically stated. In this example, and as illustrated in the example situation 400 of FIG. 4, the resource manager can determine that two requests are to be made, with one to a virtual machine manager 216 or other such service, and one to an identity manager 220 or other such service. For the virtual machine manager, the resource manager 212 can generate a request to create a virtual machine instance on behalf of the customer. The resource manager 212 can also digitally sign the request 402 using a symmetric or asymmetric key for the resource manager. In this example the resource manager also requests to add one or more tags as part of the request, where those tags can also be digitally signed using the key for the resource manager. In this way, an entity receiving the request can verify that the resource manager tags were added by the resource manager, and that the resource manager request was also generated by the resource manager.

In addition, the request 402 sent from the resource manager 212 to the virtual machine manager 216 can include the tags specified by the client device 202. The client tags can still be signed by the customer, such that any entity receiving the request can verify that the customer intended the customer tags to be applied, and that the customer tags were not instead applied by the resource manager or another such system or service.

A similar request 404 can be sent from the resource manager 212 to an identity manager 220 or other such service. This request can constitute a request from the resource manager 212 to create an identity role associated with the customer that has the customer tags associated therewith. The request 404 can be digitally signed by the resource manager 212. Any tags to be applied for the role on behalf of the resource manager 212 can also be digitally signed by the resource manager. The request 404 can also include the tags applied by the client device and digitally signed under the customer key. Thus, the identity manager 220 upon receiving the request 404 can determine that the request was generated by the resource manager 212, the resource manager indicated to add the resource manager-specific tags, and the customer indicated to add the customer-specific tags. Because each request along the chain builds on any earlier chain, the identity manager can also verify that no tags or requests were omitted or removed along the way.

Figure 5:
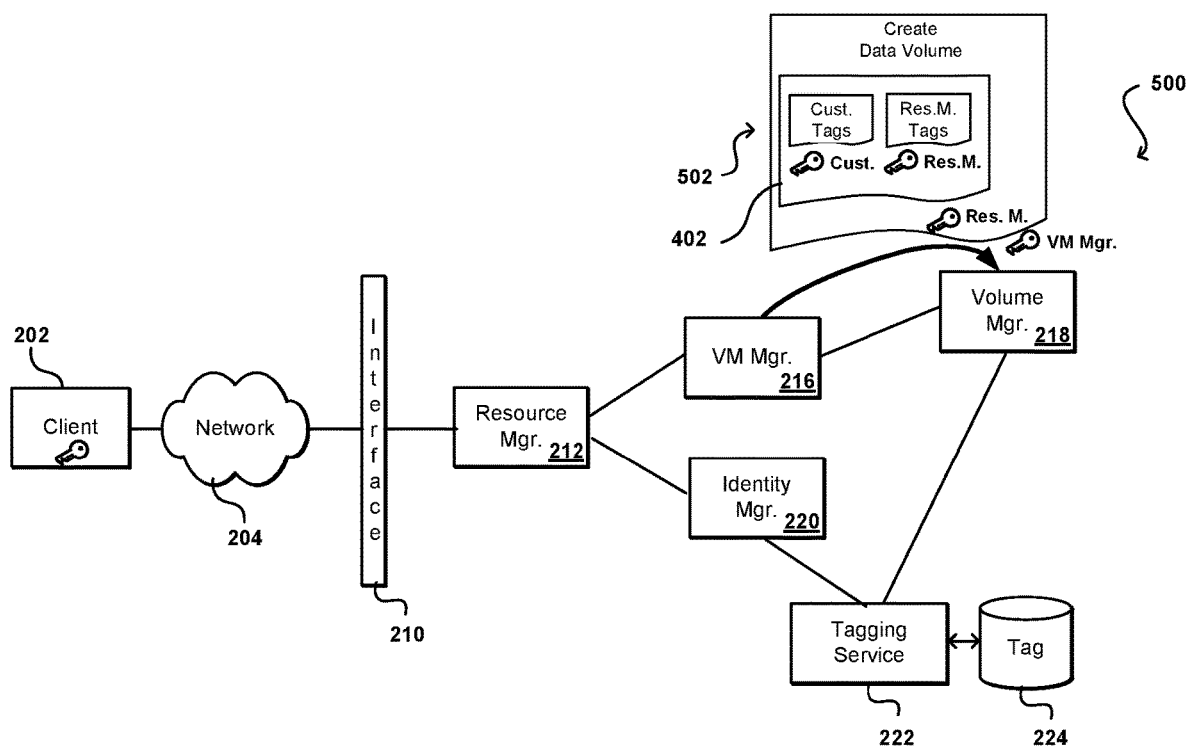
FIG. 5 illustrates a fourth request along a request chain that can be utilized in accordance with various embodiments.

As illustrated in the example situation 500 of FIG. 5, the volume manager 216 can provision an appropriate virtual machine (or set of virtual machines) in response to the request from the resource manager 212. The virtual machine manager can also determine that one or more data volumes will need to be provisioned for the request. Accordingly, the virtual machine manager 216 can send another request 502 to a data volume manager 218 or other such service. The request 502 can constitute a request to provision one or more data volumes on behalf of the customer, and can be digitally signed by the virtual machine manager 216. If the virtual machine manager were to add any tags, those tags could be signed using a virtual machine manager-specific key as well.

Included in the signed request 502 is the earlier signed request 402 from the resource manager, along with the signed tags for the resource manager and the client. The volume manager 218, upon receiving the request 502, can verify the source of the request using the respective key for the virtual machine manager 216. It should be noted that in some embodiments a service can contact another service, such as a credential management service, to verify a signature without having to have access to, or securely store, credentials for other services. In some embodiments, the tagging service 222 can be used for this purpose, among others discussed and suggested herein. In addition, in this embodiment the volume manager 218 can determine that a data volume provisioned for the customer should have the tags associated that were added by the client device and the resource manager. Since the requests to add the tags are still signed under the respective signatures, the sources of these tags can be verified.

Figure 6:
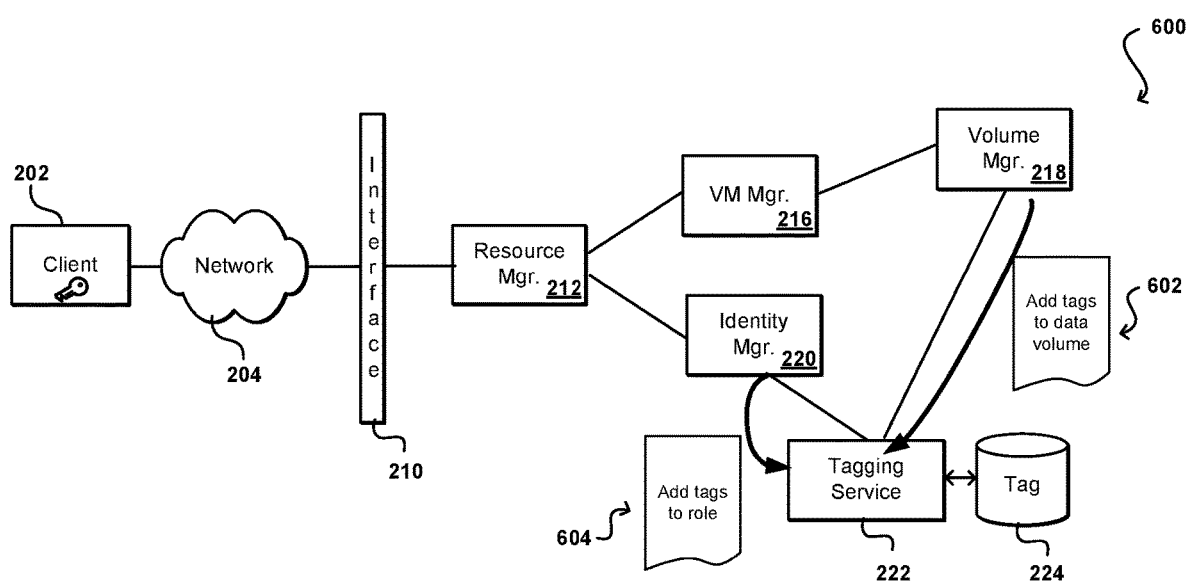
FIG. 6 illustrates requests to a tagging service that can be utilized in accordance with various embodiments.

As illustrated in the example situation 600 of FIG. 6, the end service in each of these request chains can contact a tagging service to cause the tags to be added as requested. For example, the volume manager 218 can request that the tags from the customer and the resource manager be added to, or associated with, the data volume(s) allocated for the customer under the request. Similarly, the identity manager 220 can request that the tags from the customer and the resource manager be added to, or associated with, the role(s) allocated for the customer under the request. The tagging service 222 can analyze the requests received by, in part, examining the bundle of tags to be applied. In at least some embodiments, each service can also examine the bundle of tags as discussed elsewhere herein.

In this example, the request 602 to add the tags to the data volume can include all the information included in the request from the virtual machine manager 216, with the tags and requests signed under the appropriate signatures. Upon receiving the request, the tagging service can examine the request 602 to determine tags to be added to the data volume. For the determined tags, the tagging service can analyze the signatures in the request to verify that the tags to be added to resources associated with the customer were signed by the customer. The tagging service can also analyze the signatures to verify that the tags to be added to the resources allocated by the resource manager were signed by the resource manager. For any other tags to be added per the request, the tagging service can verify that the tags were signed by the appropriate entity, component, system, or service. In addition to the presence of the tags under the appropriate signatures, the tagging service can verify that the tags were added by an authorized and/or appropriate chain of requests (i.e., service calls). This can include, for example, that a request chain from the client device 202 to the volume manager 218 includes requests from the appropriate intermediaries, in this case the resource manager 212 and the virtual machine manager 216. In at least some instances, at least some of the ordering may matter as well. For example, in some embodiments a resource manager might contact a volume manager before a resource manager, but it might always be the case that the client device would first call the resource manager 212, among other such options. Further, the tagging service can (alone or in combination with an identity broker or other such service) validate the signatures on the request to ensure that the data was not changed or removed. This can include, for example, analyzing each key to ensure that the key is still valid, is the correct signature for the purported entity, and is authorized to be used to sign that type of request, among other such options. Further, in some embodiments the tagging service can perform an authorization check to determine that each purported entity is authorized to have that type of tag added to that type of resource, among other such checks. The tags, once the request is verified and authorized, can be added to the appropriate resource, such as by storing the tags as metadata at the resource, adding a tag record to a tag repository, writing the tags to an audit service, or storing the tags in memory of a resource manager, among other such options. The tags in at least some embodiments can be stored in one or more places that enable those tags to be accessible for determining applicable rules, policies, authorization criteria, and other such information as discussed and suggested elsewhere herein.

In this example, the authorization decisions can include decisions such as whether the customer is authorized to make a request to create and tag a resource, and whether any service along the request chain is authorized to set tags for that service. If the authorization succeeds for all of these questions, the request can be processed. An example contribution signature in JSON is given by:

```
{
'actorID': 'ABCD01234567890123456',
'action': 'addTags',
'parameters': {
'key': 'ws:srvcA:stack',
'value': 'pancake'
},
'signature': 'Q29saW5XYXRzb36Sb2Nrcwo='
}
```

The processing by the tagging service can help to ensure that any resources spawned by the services for the request are tagged with the appropriate tags, including those specified on behalf of the customer and other services along the request chain. The customer and each of the services, however, should only be authorized to set their own tags, even if those tags will apply to a resource generated by a different service. In at least some embodiments, the tagging does not occur until the resource is created, as there is nothing to tag before the resource exists. When the tagging occurs (i.e., when the tagging service is called), the following is an example of the bundle of tags that will be applied:

- myname=Spike
- ws:ServiceA:stack=pancake
- ws:ServiceB:template=cumulonimbus
- ws:ServiceC:favoriteHypervisor=Xen
- ws:ServiceD:bucket=dearliza As mentioned, such an approach can also ensure that no tags were omitted from the request. For example, a service or actor along the request chain might decide to remove a tag for a number of different reasons. If this tag was added by a particular service, then the signature for that service will no longer validate. A determination can be made that a tag was removed, and an appropriate action can be taken, such as to fail the request or generate a notification about the missing tag.

In some embodiments, the tags to be added for a resource can be "special" tags, or tags of a specified type, that are able to be applied by other resources. For these types of tags, a service might be able to have the tag applied on behalf of a customer (or other such source or entity) where that tag can be signed by the service or resource requesting to add the tag. For such tags, however, the service requesting to add the tag may have to include (or otherwise provide) a token indicating that the service is authorized to request to add the tag on behalf of the customer, which would then not require a customer signature on the tag. The token can be any appropriate type of temporary credential, for example, that can enable a service or resource to act on behalf of a customer or other such entity, at least for specified tasks or actions. In some embodiments, the temporary credentials can include unique keys, which in some embodiments can include one or more keys associated with the customer. The token can include chain information as well, in order to follow the calls and enable a receiving service to make a decision as to whether or not to perform an action, such as to add a special tag to a resource. In this way, a tag to be added may not need to be signed by an associated entity so long as a token enables a service to add that tag on behalf of the entity and the request chain can be verified. The request chain can indicate the source of the request, such as the entity that contacted a token issuing authority for the token that indicates the entity that is authorized to act on behalf of the customer. In some embodiments, a token exchange can occur at each stage wherein the called service passes the received token to an authentication layer and receives back a new token that can be used to call a downstream service or perform another such task. Each new token, or iteration of the token, will include updated chain information.

Figure 7:
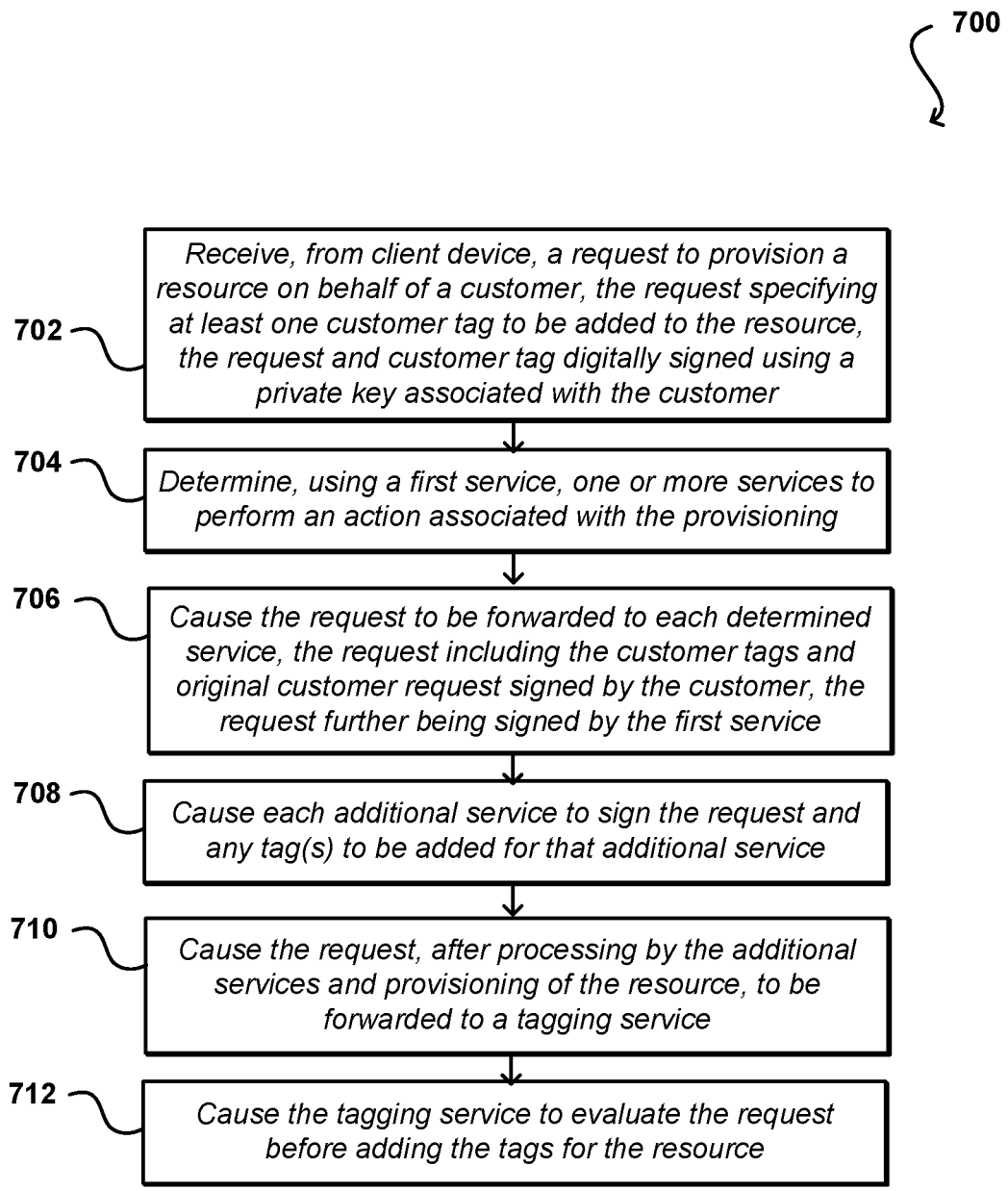
FIG. 7 illustrates an example process for generating a request to add tags for a resource that can be utilized in accordance with various embodiments.

FIG. 7 illustrates an example process 700 for enabling tags to be added to resources and other elements or objects in an electronic environment that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 702, from a client device, to provision a resource on behalf of a customer. It should be understood that various other types of requests from other types of sources can be used as well within the scope of the various embodiments. In this example, the request specifies at least one customer tag to be added to the resource. The request can include other objects or information as well, such as a resource template for the customer. The tags, metadata, any objects, and request(s) can all be digitally signed using a customer signature or key, among other such options.

Upon receiving the request, such as to a resource management service, a determination can be made 704 as to one or more services to perform an action associated with the provisioning. This can include, for example, creating an identity role, instantiating a virtual machine instance, allocating a data storage volume, and other such tasks. The request can be caused 706 to be forwarded, sequentially or otherwise, to these services. In some cases the request will be forwarded to each of these services along a request chain, while in other cases there might be two or more requests sent in parallel, where each of those requests would be signed by the last service having received and then forwarded the request. It should be understood that by "forwarding" the request it should be understood that the forwarded request can have additional information added by that service as discussed elsewhere herein, and is not intended to imply that the request is forwarded without modification unless otherwise stated. Each service receiving the request thus can be caused to digitally sign 708 the request and any tags or objects to be added to the request on behalf of that service. After processing by each service along the particular request chain, the request can be caused 710 to be forwarded to a tagging service, or other such system. The tagging service can then be caused 712 to evaluate the request before adding or replacing the tags for the resource.

Figure 8:
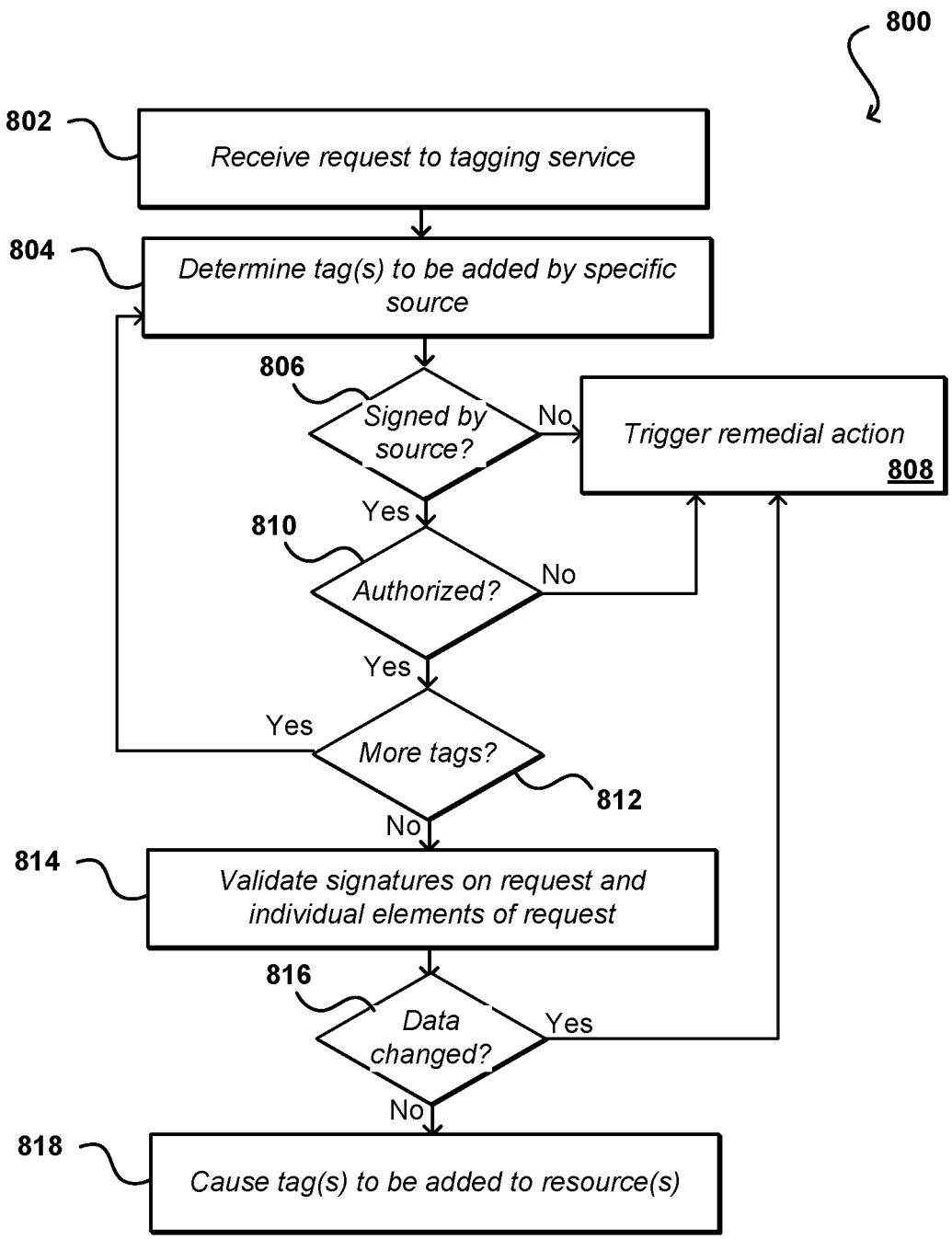
FIG. 8 illustrates an example process for evaluating a tag request that can be utilized in accordance with various embodiments

FIG. 8 illustrates an example process 800 for evaluating such a request that can be performed in accordance with various embodiments. In this example, a request is received 802 to a tagging service that includes one or more tags to be added to a resource or other such object. As mentioned, the request can be received to a tagging service or other such system. Further, a request may also (or alternatively) request to replace or remove existing tags that are currently applied to a resource or object, and such requests can be processed using a similar approach wherein the request to remove or replace is signed by the appropriate source(s). There may also be multiple tags in the request that could have been added by multiple sources. For a specific source, the tag(s) to be added can be determined 804, and a determination can be made 806 as to whether each such tag was signed by that source. If not, assuming the system requires all such tags to be signed, a remedial action can be triggered 808. This can include, for example, failing the request or notifying an entity associated with the source (along with other appropriate people) of the deficiency. A determination can also be made 810 as to whether that source is authorized to add that tag. For example, a certain type of source might only be able to add certain types of tags, and sources may not be allowed to add certain tags on behalf of other services or entities. A specific instance of a resource may also not be authorized to add a specific tag for the resource, among other such options. Further, if the tag is a special tag as discussed previously where the tag may not be signed by the associated customer, for example, an authorization determination can include determining whether a valid token was included (or is available) that indicates that the requesting service is authorized to request to add the tag on behalf of the customer. In some embodiments a whitelisting process can be used as part of the tag evaluation process. If not authorized, a remedial action can be triggered. The process can continue as long as it is determined 812 that there are more tags from more sources in the request. If tags have all been determined to have been tagged by the appropriate authorized entity, the signatures on the request and the individual elements of the request can be validated 814. This can help to ensure that no data was changed or omitted from a prior request along the request chain. If any data was changed or omitted 816, a remedial action can be triggered. Otherwise, the tag(s) can be caused to be added to the corresponding resource(s) using any of a number of approaches discussed and suggested herein.

An advantage to using tags and a signed request chain is the providing of some level of access control. A tagging service can utilize one or more policies to determine which types of tags are allowed to be added by which resources, and this might vary by customer. The presence of the customer signature on the request also helps to demonstrate that the customer actually authorized the adding of tags, and the tags are within the scope of authority that was included in the original request. The chain of custody also helps to determine which service added which tag, which helps with troubleshooting in the event a tag is improperly added or replaced, for example. In some embodiments the signatures can also be kept with the tags over time to determine information about the source of the tag and/or the reasons(s) for the creation of the tag. In some embodiments information about an attestation can be kept in a log or other such location to help with auditing or troubleshooting, among other such tasks.

Figure 9:
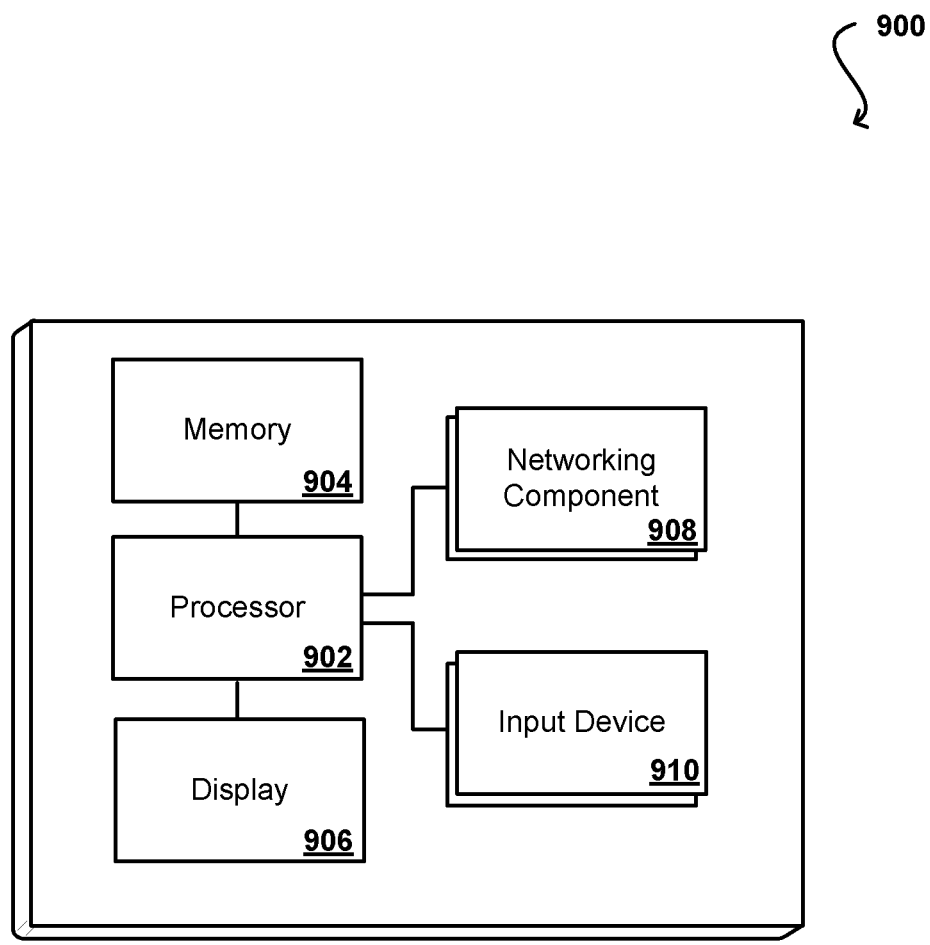
FIG. 9 illustrates example components of a computing device that can be used to implement aspects of various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving, to a computing resource environment, a first signed request comprising signed tagging metadata for tagging a resource that is to be provisioned in the computing resource environment with at least one service;
    determining that the first signed request comprises at least one second signed request and at least one second signed metadata that are signed by at least one second entity that is other than a source of the signed request;
    validating a first signature for the first signed request and at least one second signature for the at least one second signed request; and
    provisioning the resource with access to the at least one service based in part on an association of the at least one service with the at least one second signed metadata.

2. The computer-implemented method of claim 1, further comprising:
    verifying, by a notation service, that the first signed request and the at least one second signed request correspond to a valid request chain for provisioning the resource.

3. The computer-implemented method of claim 1, further comprising:
    verifying, by a notation service, that authorization exists to have a first key-value pair applied to the resource and that authorization exists for at least one of the entities to have a second key-value pair applied to the resource.

4. The computer-implemented method of claim 1, further comprising:
    causing the signed tagging metadata to be stored to a metadata repository for the computing resource environment, the metadata repository being searchable using a search key and an associated value, by a notation service, to determine metadata that are currently applied to resources in the computing resource environment.

5. A system, comprising:
    at least one processor; and
    memory including instructions that, when executed by the at least one processor, cause the system to:
        receive, to a computing resource environment, a first signed request comprising signed tagging metadata for tagging a resource by a first source;
        determining that the first signed request comprises at least one second signed request and at least one second signed metadata that are signed by at least one second source that is other than the first source;
        validating a first signature for the first signed request and at least one second signature for the at least one second signed request; and
        provisioning the resource with access to at least one service of the at least one second source based in part on the at least one second signed metadata.

6. The system of claim 5, wherein the instructions that, when executed by the at least one processor, further cause the system to:
    cause at least the first signature to be stored with the signed tagging metadata in the metadata repository, the first signature indicating the first source of the signed tagging metadata for the resource.

7. The system of claim 5, wherein the instructions that, when executed by the at least one processor, further cause the system to:
    determine that an instance of metadata to be applied to the resource is not signed by a source associated with the signed tagging metadata;
    determine that the at least one second request includes a token indicating an authorization to have the instance of metadata applied to the resource on behalf of the source; and
    cause the instance of metadata to be applied to the resource.

8. The system of claim 5, wherein the at least one second signed request includes at least an additional request for an additional service to perform tasks associated with the resource, the additional request digitally signed by an additional service.

9. The system of claim 8, wherein the additional service is enabled to include additional metadata to be applied to the resource, each instance of an additional metadata digitally signed by the additional service providing the instance of the additional metadata.

10. The system of claim 5, wherein the instructions that, when executed by the at least one processor, further cause the system to:
    verify an order of the at least one second request and an additional request contained within a request chain of the first signed request.

11. The system of claim 5, wherein the instructions that, when executed by the at least one processor, further cause the system to:

analyze at least one policy for the resource to determine whether the signed tagging metadata is authorized to be applied to the resource.

12. The system of claim 5, wherein the instructions that, when executed by the at least one processor, further cause the system to:

verify, by a notation service, that the first signed request and the at least one second signed request correspond to a valid request chain for provisioning the resource.

13. The system of claim 5, wherein the instructions that, when executed by the at least one processor, further cause the system to:

verify, by a notation service, that authorization exists to have a first key-value pair applied to the resource and that authorization exists for the at least one second source to have a second key-value pair applied to the resource.

14. The system of claim 5, wherein the instructions that, when executed by the at least one processor, further cause the system to:

cause the signed tagging metadata to be stored to a metadata repository for the computing resource environment, the metadata repository being searchable using a search key and an associated value, by a notation service, to determine metadata that are currently applied to resources in the computing resource environment.

15. The system of claim 5, wherein the instructions that, when executed by the at least one processor, further cause the system to:

analyze the at least one second request to determine that the at least one second request is signed by the at least one second source, and that the first signed request and the tagging metadata are signed by the first source.

16. A non-transitory computer readable medium comprising instructions that when executed by at least one processor cause the at least one processor to:

receive, to a computing resource environment, a first signed request comprising signed tagging metadata for tagging a resource by a first source;

determining that the first signed request comprises at least one second signed request and at least one second signed metadata that are signed by at least one second source that is other than the first source;

validating a first signature for the first signed request and at least one second signature for the at least one second signed request; and provisioning the resource with access to at least one service of the at least one second source based in part on the at least one second signed metadata.

17. The non-transitory computer readable medium of claim 16 comprising the instructions that when executed by the at least one processor further cause the at least one processor to:

cause at least the first signature to be stored with the signed tagging metadata in the metadata repository, the first signature indicating the first source of the signed tagging metadata for the resource.

18. The non-transitory computer readable medium of claim 16 comprising the instructions that when executed by the at least one processor further cause the at least one processor to:

determine that an instance of metadata to be applied to the resource is not signed by a source associated with the signed tagging metadata;

determine that the at least one second request includes a token indicating an authorization to have the instance of metadata applied to the resource on behalf of the source; and cause the instance of metadata to be applied to the resource.

19. The non-transitory computer readable medium of claim 16, wherein the at least one second signed request includes at least an additional request for an additional service to perform tasks associated with the resource, the additional request digitally signed by an additional service.

20. The non-transitory computer readable medium of claim 19, wherein the additional service is enabled to include additional metadata to be applied to the resource, each instance of an additional metadata digitally signed by the additional service providing the instance of the additional metadata.

* * * * *